(12) United States Patent
Diorio et al.

(10) Patent No.: US 7,183,926 B2
(45) Date of Patent: Feb. 27, 2007

(54) ADAPTABLE BANDWIDTH RFID TAGS

(75) Inventors: Christopher J. Diorio, Shoreline, WA (US); Scott Anthony Cooper, Seattle, WA (US); John D. Hyde, Corvallis, OR (US); Amir Sarajedini, Aliso Viejo, CA (US); Kurt Eugene Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 169 days.

(21) Appl. No.: 10/823,991

(22) Filed: Apr. 13, 2004

(65) Prior Publication Data

US 2005/0225435 A1    Oct. 13, 2005

(51) Int. Cl.
*H04B 1/06* (2006.01)
*H04B 7/00* (2006.01)
*G01S 13/75* (2006.01)

(52) U.S. Cl. .................................. 340/572.4; 455/266

(58) Field of Classification Search ................ 375/136, 375/137, 222, 275, 328; 455/257, 226.1, 455/266, 266.1, 176.1, 180.1, 180.4, 188.1, 455/191.3, 150.1; 340/568.1–572.9, 2.1, 340/10.1, 10.5, 10.51, 10, 10.52, 10.2; 700/224–227
See application file for complete search history.

(56) References Cited

U.S. PATENT DOCUMENTS

| | | | |
|---|---|---|---|
| 4,783,783 A | 11/1988 | Nagai et al. | 371/12 |
| 4,935,702 A | 6/1990 | Mead et al. | 330/9 |
| 5,307,515 A | 4/1994 | Kuo et al. | 455/295 |
| 5,491,484 A * | 2/1996 | Schuermann | 342/51 |
| 5,686,902 A | 11/1997 | Reis et al. | 340/825.54 |
| 5,805,632 A | 9/1998 | Leger | 375/122 |
| 5,933,039 A | 8/1999 | Hui et al. | 327/262 |
| 5,939,945 A | 8/1999 | Thewes et al. | 330/277 |
| 5,952,922 A | 9/1999 | Shober | 340/572.4 |
| 5,952,935 A | 9/1999 | Mejia et al. | 340/825.54 |
| 6,130,632 A | 10/2000 | Opris | 341/120 |
| 6,134,182 A | 10/2000 | Pilo et al. | 365/233 |
| 6,177,861 B1 | 1/2001 | MacLellan et al. | 340/10.1 |
| 6,208,235 B1 * | 3/2001 | Trontelj | 340/10.1 |

(Continued)

FOREIGN PATENT DOCUMENTS

EP    0 298 618    1/1989

(Continued)

OTHER PUBLICATIONS

L. Richard Carley, "Trimming Analog Circuits Using Floating-Gate Analog MOS Memory", IEEE Journal of Solid-State Circuits 24, No. 6, Dec. 1989, pp. 1569-1575.

(Continued)

*Primary Examiner*—Daniel Wu
*Assistant Examiner*—Jennifer Mehmood
(74) *Attorney, Agent, or Firm*—Thelen Reid Brown Raysman & Steiner LLP; David B. Ritchie

(57) ABSTRACT

RFID tags, tag circuits, and methods adapting the reception bandwidth. A tag has a decoder for decoding a first received wireless signal subject to a reception bandwidth setting. The tag also has a selector switch for transitioning to a different setting, such as by switching to using a different filter. A subsequently received second signal is decoded subject to the new reception bandwidth setting.

46 Claims, 7 Drawing Sheets

U.S. PATENT DOCUMENTS

| | | | |
|---|---|---|---|
| 6,266,362 B1 | 7/2001 | Tuttle et al. | 375/141 |
| 6,317,027 B1 | 11/2001 | Watkins | 340/10.1 |
| 6,320,788 B1 | 11/2001 | Sansbury et al. | 365/185.1 |
| 6,357,025 B1 | 3/2002 | Tuttle | 714/724 |
| 6,603,391 B1 | 8/2003 | Greeff et al. | 340/10.3 |
| 6,765,484 B2 | 7/2004 | Eagleson et al. | 340/505 |
| 6,831,562 B2 | 12/2004 | Rodgers et al. | 340/572.4 |
| 7,005,965 B2 | 2/2006 | Chen et al. | 340/10.2 |
| 2001/0010491 A1* | 8/2001 | Marneweck et al. | 340/10.33 |
| 2002/0167405 A1 | 11/2002 | Shanks et al. | 340/572.1 |
| 2004/0174244 A1 | 9/2004 | Eidemiller | 340/5.61 |
| 2005/0104790 A1* | 5/2005 | Duron | 343/745 |
| 2005/0128159 A1 | 6/2005 | Wang et al. | 343/844 |

FOREIGN PATENT DOCUMENTS

| | | |
|---|---|---|
| EP | 0 681 192 | 11/1995 |
| EP | 0 696 852 | 2/1996 |
| EP | 0 715 417 | 6/1996 |
| EP | 0 939 496 | 9/1999 |
| WO | 01 73854 | 10/2001 |

OTHER PUBLICATIONS

Partial International Search for International Application No. PCT/US03/31792, date mailed Apr. 2, 2004.

Jonietz, Erika, "Tracking Privacy", Technology Review, Jul./Aug. 2004, pp. 74-75.

Raszka et al., "Embedded Flash Memory for Security Applications in a 0.13 µm CMOS Logic Process", Digest of Technical Papers, IEEE International Solid-State Circuits Conference 2004, p. 46.

Weis, Stephen A., et al., Security and Privacy Aspects of Low-Cost Radio Frequency Identification Systems, Laboratory for Computer Science, Auto-ID Center, Massachusetts Institute of Technology, pp. 1-12.

Yoshida, Junko, "RFID "kill" Feature Aims to Soothe Privacy Fears", EE Times, Apr. 28, 2003, pp. 1, 86.

International Search Report, for International Application No. PCT/US2005/012490, date mailed Jul. 25, 2005.

Written Opinion of the International Preliminary Examining Authority for International Application No. PCT/US05/12490, date of mailing Jun. 27, 2006.

* cited by examiner

ADAPTABLE BANDWIDTH RFID TAGS

FIELD OF THE INVENTION

The present invention is related to the field of Radio Frequency IDentification (RFID) tags, and more specifically to tags able to adapt their reception bandwidth.

BACKGROUND

Radio Frequency IDentification (RFID) tags can be used in many ways for locating and identifying objects that they are attached to. RFID tags are particularly useful in product-related and service-related industries for tracking large numbers of objects are being processed, inventoried, or handled. In such cases, an RFID tag is usually attached to individual items, or to their packages.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a radio section, a logical section, and a memory. Advances in semiconductor technology have miniaturized the electronics so much that an RFID tag can generate the backscatter while powered by only the RF signal it receives, enabling some RFID tags to operate without a battery.

A challenge in the operation of RFID systems arises from interference, when other RF signals are also transmitted in the vicinity at the same time. Interfering RF signals may be generated, for example, from nearby wireless devices such as other RFID readers, and also cellular telephones, personal digital assistants, and the like. In those instances, an RFID tag cannot detect the interrogating RF wave reliably, or parse its commands.

When an RFID reader detects that there is interference, it may lower the data rate of its transmission. This will permit any RFID tags that receive the transmission to analyze it more robustly.

The challenge, however, becomes that the RFID tags might not know the changed data rate of the transmission by the RFID reader. Accordingly, an RFID tag might not be able to discern the interrogating RF wave from interfering RF signals. If this happens, the RFID tag might not be able to analyze properly the interrogating RF wave for responding.

BRIEF SUMMARY

The invention improves over the prior art. Briefly, the present invention provides RFID tags, tag circuits, and methods for adapting the reception bandwidth. A tag according to the invention has a decoder for decoding a first received wireless signal subject to a reception bandwidth setting. The tag also has a selector switch for transitioning to a different setting, such as by switching to using a different filter. A subsequently received second signal is decoded subject to the new reception bandwidth setting.

The invention offers the advantage that the RFID tag will adapt to receiving data at a bandwidth that is best suited for the incoming transmission and the environment.

These and other features and advantages of the invention will be better understood from the specification of the invention, which includes the following Detailed Description and accompanying Drawings.

BRIEF DESCRIPTION OF THE DRAWINGS

The invention will become more readily apparent from the following Detailed Description, which proceeds with reference to the accompanying drawings, in which.

DETAILED DESCRIPTION

Figure 1:
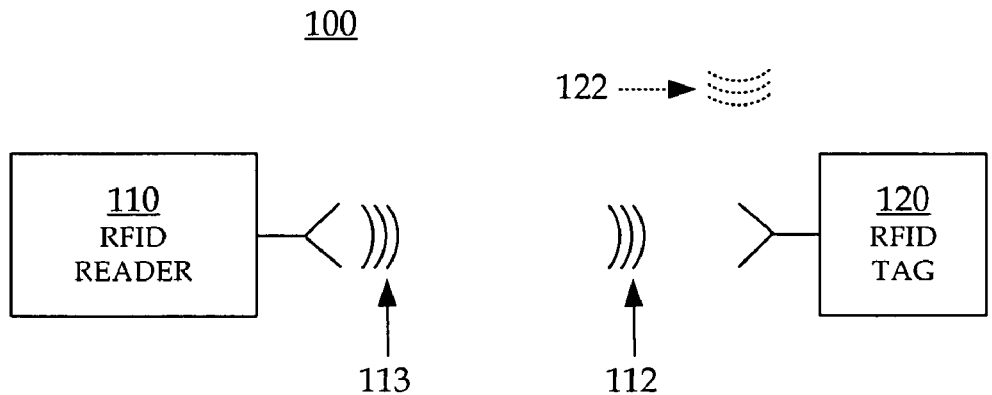
FIG. 1 is a block diagram of an RFID system according to the invention.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on.

Accordingly, the present invention may take the form of an entirely hardware embodiment, an entirely software embodiment or an embodiment combining software and hardware aspects. The following detailed description is, therefore, not to be taken in a limiting sense.

Additionally, the present invention may be implemented in RFID tags that are capable of operating with or without a battery.

As has been mentioned, the present invention provides tag circuits, and methods for adapting the receiving bandwidth, such as by switching to using a different filter. The invention is now described in more detail.

FIG. 1 is a diagram of an RFID system 100 according to the invention. An RFID reader 110 transmits an interrogating RF wave, which may be continuous. Two RF signals 112, 113 are shown as discontinuous to denote their possibly different treatment, but that is only for illustration, but they may, in fact, be part of the same continuous signal. An RFID tag 120 in the vicinity of RFID reader 110 may sense the interrogating RF wave, and generate backscatter (not shown). RFID reader 110 senses and interprets any received backscatter.

In the vicinity there is also interference, shown here in the form of RF wave 122 from another other source (not shown). RF wave 122 arrives at tag 120 at the same time as intended interrogating signal 112. While RF wave 122 might not have the same carrier frequency as interrogating signal 112, it might have a close enough carrier frequency that generates a beat frequency with it. The beat frequency in turn interferes with reception, as will be seen below.

Figure 2A:
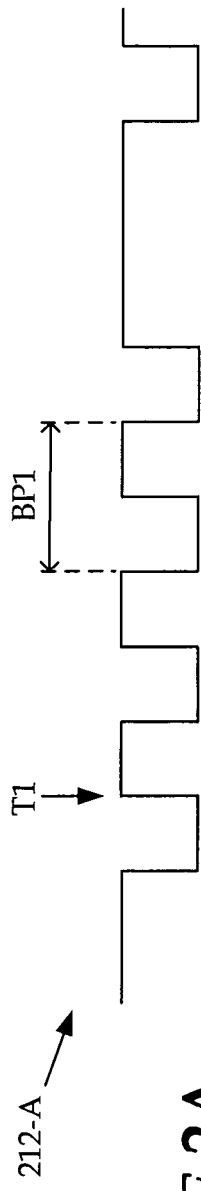
FIGS. 2A, 2B, 2C depict a waveform of an interrogating RF wave of FIG. 1 at three different data rates.
Figure 2B:
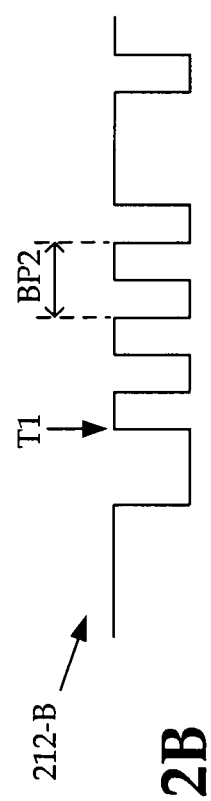
Figure 2C:
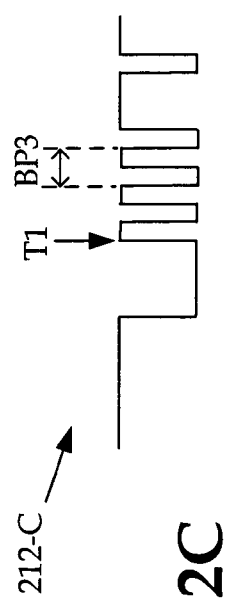

FIGS. 2A, 2B, 2C depict respectively sample waveforms 212-A, 212-B, 212-C of interrogating RF signal 112 of FIG. 1, at three different data rates. Sample waveforms 212-A, 212-B, 212-C are those of a preamble, which starts with four symbols for zero, then a prespecified symbol called a "violation", and then followed by another zero symbol. In all cases, the first low pulse has the same duration, of at least 12.5 μsec, which is perceived at time T1 and can be measured. The remaining transitions, however, take place at the different data rates. For example, waveforms 212-A, 212-B, 212-C could be taking place at 40, 80 and 160 kbps, respectively.

Figure 3:
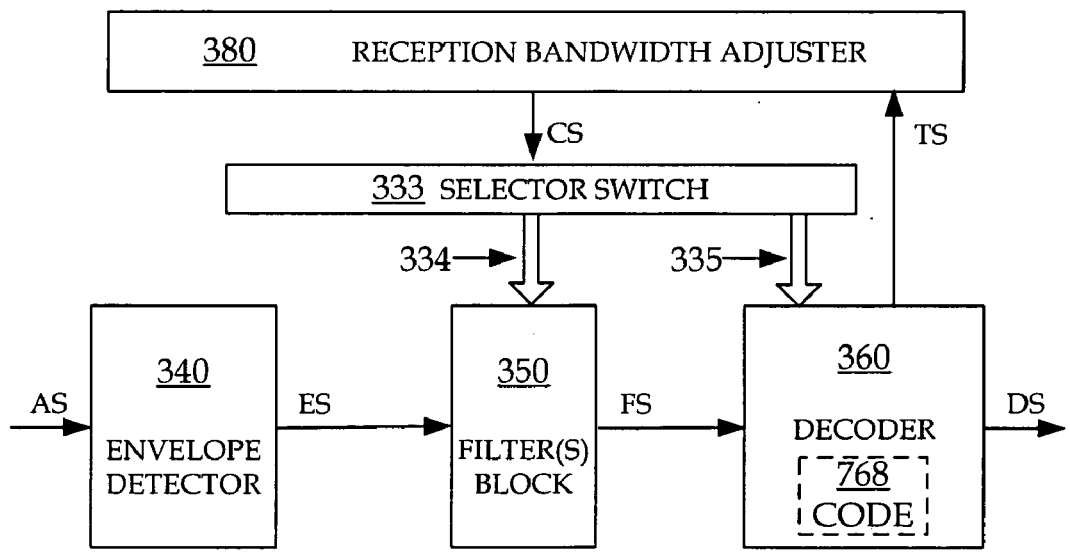
FIG. 3 is a block diagram showing a group of components of an RFID tag of FIG. 1 according to an embodiment of the invention.

FIG. 3 is a block diagram showing a component group 320 of RFID tag 120 of FIG. 1, according to an embodiment of the invention. It will be understood that group 320 is part of a demodulator of tag 120, and that tag 320 has additional components. The blocks of group 320 may be implemented in any way known in the art, such as with analog or digital components, microprocessors, Application Specific Integrated Circuits (ASICs), and so on.

An antenna signal AS is generated from an antenna (not shown) when it receives signal 112, and later signal 113. Antenna signal AS is input in an envelope detector block 340, which in turn outputs an envelope signal ES.

A filter(s) block 350 receives envelope signal ES, and outputs filtered signal FS in response. Block 350 includes one or more filters, whose bandwidth may be adjustable according to arrow 334.

A decoder 360 includes either a single decoder 360 or a group of decoders, as will be seen below. Decoder 360 receives analog filtered signal FS, and outputs a digital decoded signal DS for further processing. A reception bandwidth setting may be controllable, according to arrow 335. Additional possible embodiments of decoder 360 are described later, with reference to FIG. 7.

Group 320 also includes a selector switch 333. Selector switch 333 controls the reception bandwidth setting of group 320, as will be described later with reference to FIG. 4. Control can be by operating at different blocks according to the invention. In the embodiments of FIG. 3, control is shown as operating either at filter(s) block 350 via arrow 334, or at block 360 via arrow 335. If the setting is adjusted after signal 112 is decoded, then a later received signal such as signal 113 will be decoded differently than signal 112.

In some embodiments of the invention, selector switch 333 is adapted to adjust the setting responsive to decoded signal DS. In one embodiment, decoder 360 generates a trigger signal TS from decoded signal DS, and selector switch 333 is adapted to be controlled from trigger signal TS. Naturally, whether trigger signal TS is provided or not, and its exact function, depend on the particular embodiment. In some instances, trigger signal TS is generated only when there is a decision to transition from one bandwidth to another.

In the embodiment of FIG. 3, group 320 also includes a reception bandwidth adjuster 380. Further, bandwidth adjuster 380 is adapted to control selector switch 333 responsive to trigger signal TS. Bandwidth adjuster 380 receives trigger signal TS, and generates control signal CS, with which it controls selector switch 333. In some embodiments, bandwidth adjuster 380 determines what setting to switch to. In other embodiments, bandwidth adjuster 380 also determines whether to transition to a different setting or not.

In some embodiments of the invention, decoder 360 is adapted to compare decoded signal DS to a preset code 768. In those cases trigger signal TS is generated responsive to the comparison. The preset code may be a portion of a preamble, such as shown in FIGS. 2A, 2B, 2C.

The comparison and its result may be implemented in many ways according to the invention. In a number of embodiments, the selector switch transitions to a new setting if the decoded signal does not match the preset code. For example, the tag could be waiting for a preamble, and as long as it is not receiving it, it could try different settings. In some of those embodiments, the setting is changed if the decoded signal does not match the preset code after a preset time period. That time period could be, for example, two preamble durations or something equivalent. If a setting fails to give good results, another one can be tried, preferably with a lower bandwidth.

In a number of other embodiments, the selector switch transitions to a new setting if the decoded signal matches the preset code. For example, with reference to FIGS. 2A, 2B, 2C, if at time T1 it is determined that the first low pulse of a preamble has been received in any of three frequencies, then the setting could skip by default to the one with the highest bandwidth, and from there back track to lower bandwidths in an attempt to match the reader. In some embodiments, the tag could initially start at a setting with the lowest bandwidth, transition to the highest, and then end up backtracking again to the lowest bandwidth.

In some embodiments, decoder 360 or another component of tag 120 may determine an active data rate of signal 112 that reader 110 is transmitting at. In a preferred embodiment decoder 360 encodes the active data rate in trigger signal, for use by adjuster 380.

The active data rate may be determined in any number of ways. In one embodiment, a bit period is determined between successively received symbols of the decoded first signal. For example, and again referring to FIGS. 2A, 2B, 2C, bit periods BP1, BP2, BP3 may be measured in respective waveforms 212-A, 212-B, 212-C, which in turn may yield the active data rate. In another embodiment, different preambles may become preassociated with different data rates by convention. In that case, the active data rate is determined from the identified preamble. In yet another embodiment of the invention, a DATA RATE command is implemented by convention, and could be used during transmission of signal 112 at a first data rate to warn of an impending change to transmitting at a second data rate for the following signal 113. In that case, the preset code is the DATA RATE command, and the decoded first signal is a DATA RATE command with an associated data rate instruction. In that case, the active data rate is determined from the instruction.

All of these functions of decoder 360 may equivalently be performed in a distributed way, such as also by other components of tag 120.

Figure 4:
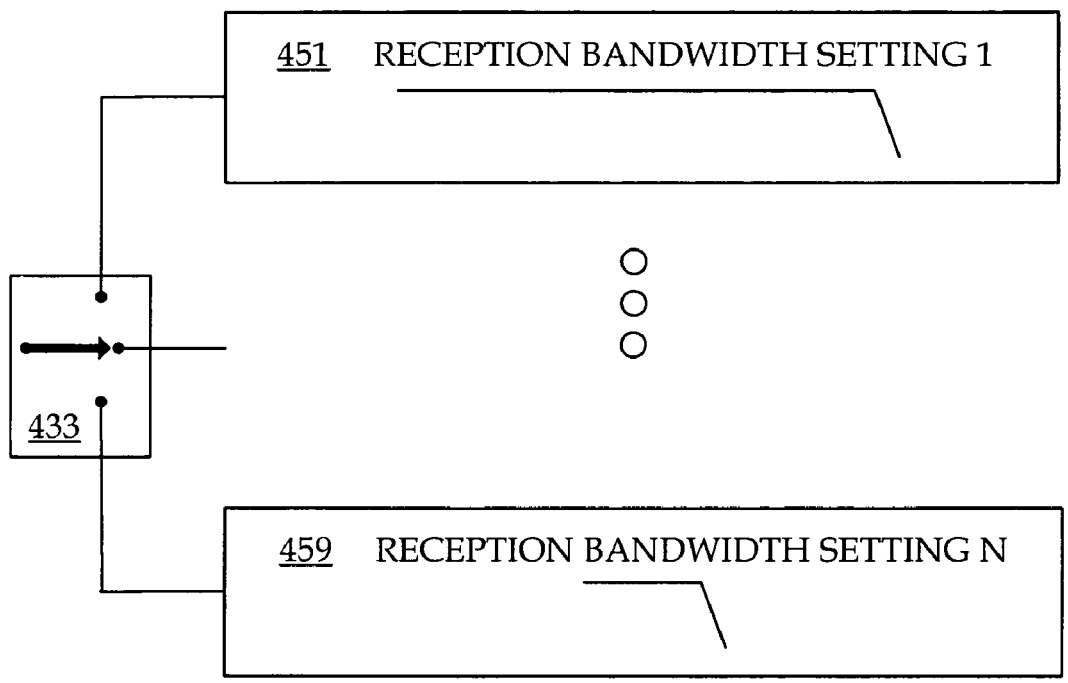
FIG. 4 is a conceptual state diagram illustrating the ability to control the reception bandwidth setting for decoding a wireless signal received in the RFID tag of FIG. 3 according to the invention.

FIG. 4 is a conceptual state diagram 400 for illustrating reception bandwidth choices according to the invention. Diagram 400 operates by analogizing from electrical concepts.

Diagram 400 includes blocks 451, . . . , 459, which represent different reception bandwidth choices for the filtering action performed in group 320. In an embodiment of the invention, there are provided as many bandwidth choices as available data rates, but that is not necessary for practicing the invention. In other embodiments, diagram 400 provides for bandwidth choices that are continuously tunable, at least over a range.

Diagram 400 also includes a conceptual selector switch 433. Conceptual switch 433 controls which one of blocks 451, . . . , 459 sets the reception bandwidth choice of group 320. The circuit can transition from one bandwidth to another by switch 433 changing which block it points to.

The conceptual state diagram of FIG. 4 may be embodied in a number of ways. Examples are described immediately below.

In one group of embodiments, a single filter may be used, where the selector switch adjusts its bandwidth. The filter may be passive or active. The bandwidth may be adjustable continuously over a range, or adjusted to discrete values. The latter may be implemented by switching on and off additional components, such as in the example below.

Figure 5:
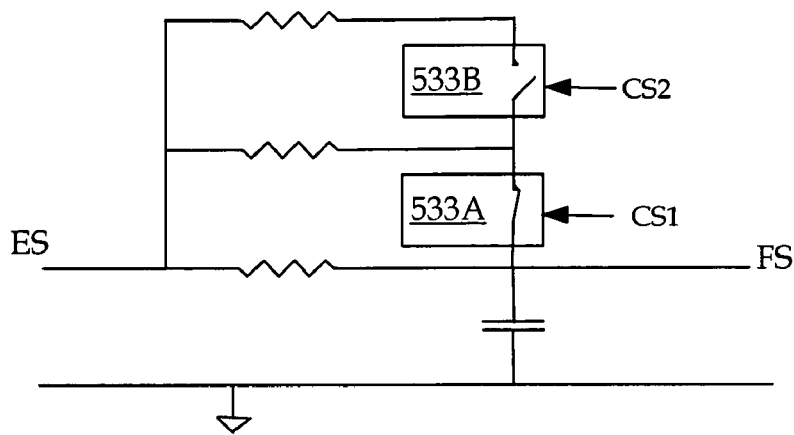
FIG. 5 is a circuit schematic of a portion of a first circuit for implementing the choice of FIG. 4 according to the invention.

FIG. 5 is a circuit schematic of a first filter circuit 520, which is a portion of filter(s) block 350 of group 320 in FIG. 3. Circuit 520 implements a filter that receives envelope signal ES, and outputs filtered signal FS. Two control signals CS1, CS2 operate selector switches 533A, 533B, respectively, to switch on and off additional resistance to the already existing resistance. Accordingly, control signals CS1, CS2 adjust the bandwidth of filter circuit 520.

Beyond the example of FIG. 5, the filter may include at least two of a resistance, a capacitance and an inductance, or even all three. At least one of the included resistance, the capacitance and the inductance can be switched on and off. In other embodiments, the filter includes a resonator such as made from a cavity, a crystal, and so on. In yet other embodiments, the filter may be made from a capacitor and a switch that is switched at a variable rate. In other embodiments, a Surface Acoustic Wave (SAW) implementation may be used, and so on.

In another group of embodiments, multiple filters may be placed in possible paths of the received signal. The selector switch routes the received first and second signals through different ones of the paths.

Figure 6:
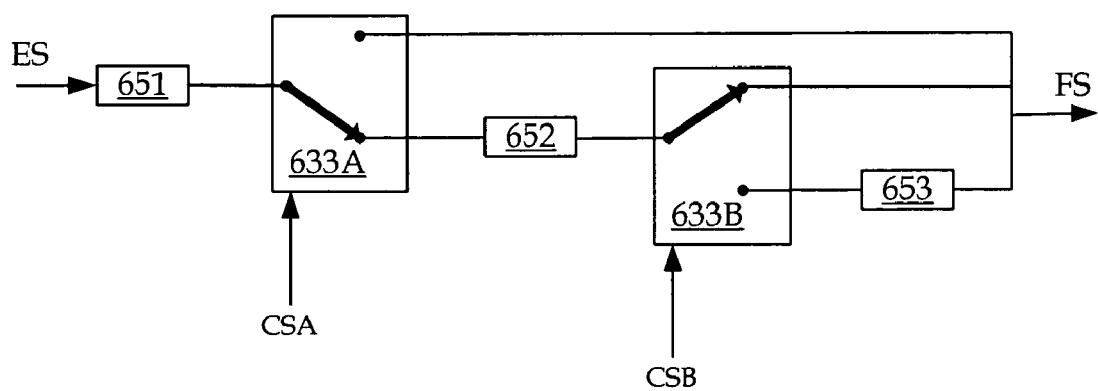
FIG. 6 is a hybrid block diagram and circuit schematic of a second circuit for implementing the choice of FIG. 4 according to the invention.

FIG. 6 is a hybrid block diagram and circuit schematic of a second filter circuit 620, which is an alternate portion of filter(s) block 350 of group 320 in FIG. 3. Circuit 620 implements a filter that receives envelope signal ES, and outputs filtered signal FS. Multiple filters 651, 652, 653 are placed in possible paths of envelope signal ES, and selector switches 633A, 633B transition the circuit to a different bandwidth by routing envelope signal ES to be filtered through a different path. Selector switches 633A, 633B operate according to control signals CSA, CSB, and therefore control the overall bandwidth of filter circuit 620.

In another group of embodiments, filtering takes place according to different bandwidths to produce differently filtered signals, and then the selector switch selects one of the filtered signals. Such embodiments are described immediately below.

Figure 7A:
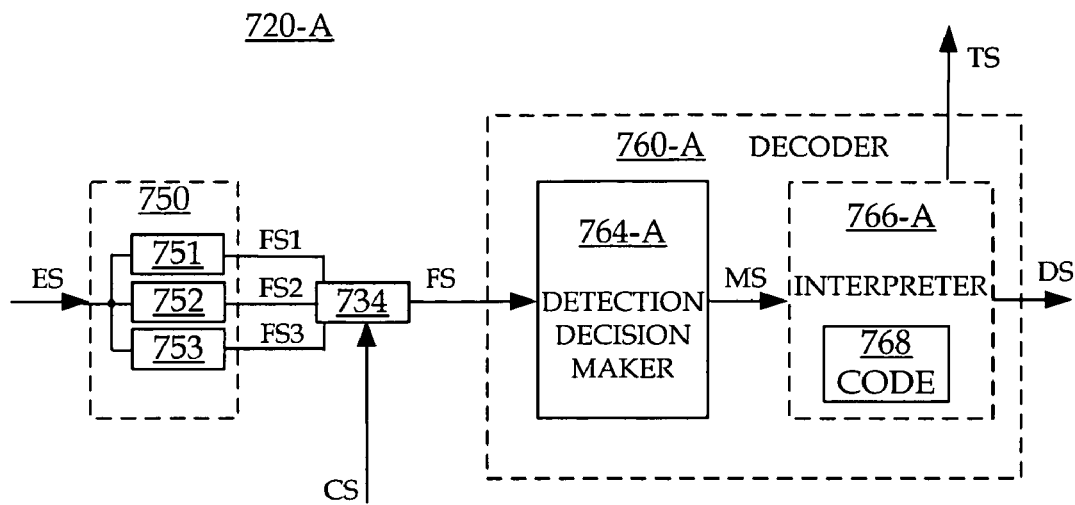
FIG. 7A is a block diagram showing a third circuit for implementing the choice of FIG. 4.

FIG. 7A is a block diagram 720-A showing a filter(s) block 750 and a decoder 760-A, both analogous to filter(s) block 350 and decoder 360 of group 320 in FIG. 3. Filter(s) block 750 includes individual filters 751, 752, 753 of different bandwidths. These filters 751, 752, 753 all receive envelope signal ES, and in response the output individual filtered signals FS1, FS2, FS3 respectively. A selector switch 734 is controlled by control signal CS, and selects which one of individual filtered signals FS1, FS2, FS3 will become the filtered signal FS. In another embodiment, selector switch 734 is not provided separately from filter(s) block 750, but as part of it: In all these embodiments, control signal CS is directed to selector switch 733.

It should be noted that in the embodiment of FIG. 7, selector switch 734 is placed after filters 751, 752, 753. That is preferred for the actual embodiments, as it permits all filters 751, 752, 753 some additional settling time, which in turn will result in more reliable filtered signals FS1, FS2, FS3 to choose from. It is an equivalent embodiment of the invention, however, to have selector switch 734 placed before filters 751, 752, 753.

In the embodiment of FIG. 7A, decoder 760-A includes a detection decision maker 764-A for generating a digital signal MS from filtered signal FS. Detection decision maker 764-A preferably includes a comparator for generating digital signals having high (H) and low (L) values from analog signals. Decoder 760-A also includes an interpreter 766-A, for outputting decoded signal DS from digital signal MS.

Figure 7B:
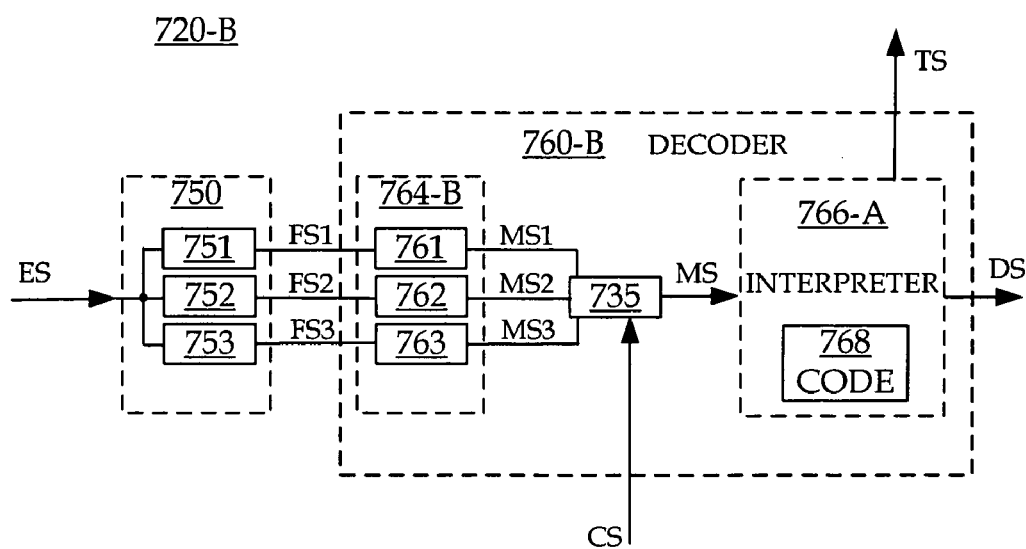
FIG. 7B is a block diagram showing an alternate embodiment of the circuit of FIG. 7A.

FIG. 7B is a block diagram 720-B showing filter(s) block 750 and a decoder 760-B, both analogous to filter(s) block 350 and decoder 360 of group 320 in FIG. 3. In fact, filter(s) block 750 is identical to what is shown in group 720-A, and outputs individual filtered signals FS1, FS2, FS3.

In the embodiment of FIG. 7B, decoder 760-B includes a group 764-B of detection decision makers 761, 762, 763, each one of which is made similarly to detection decision maker 764 of FIG. 7A. Detection decision makers 761, 762, 763 generate respective digital signals MS1, MS2, MS3 from outputs individual filtered signals FS1, FS2, FS3.

A selector switch 735 is located such that it selects which one of digital signals MS1, MS2, MS3 will be chosen to become signal MS. In another embodiment, selector switch 735 is not provided separately from block 764-B, but as part of it.

Decoder 760-B also includes interpreter 766-A, similar to what was described for group 720-A above. Interpreter 766-A outputs decoded signal DS from digital signal MS. In other embodiments, three interpreters are provided, and the output of one is chosen, and so on.

Figure 8:
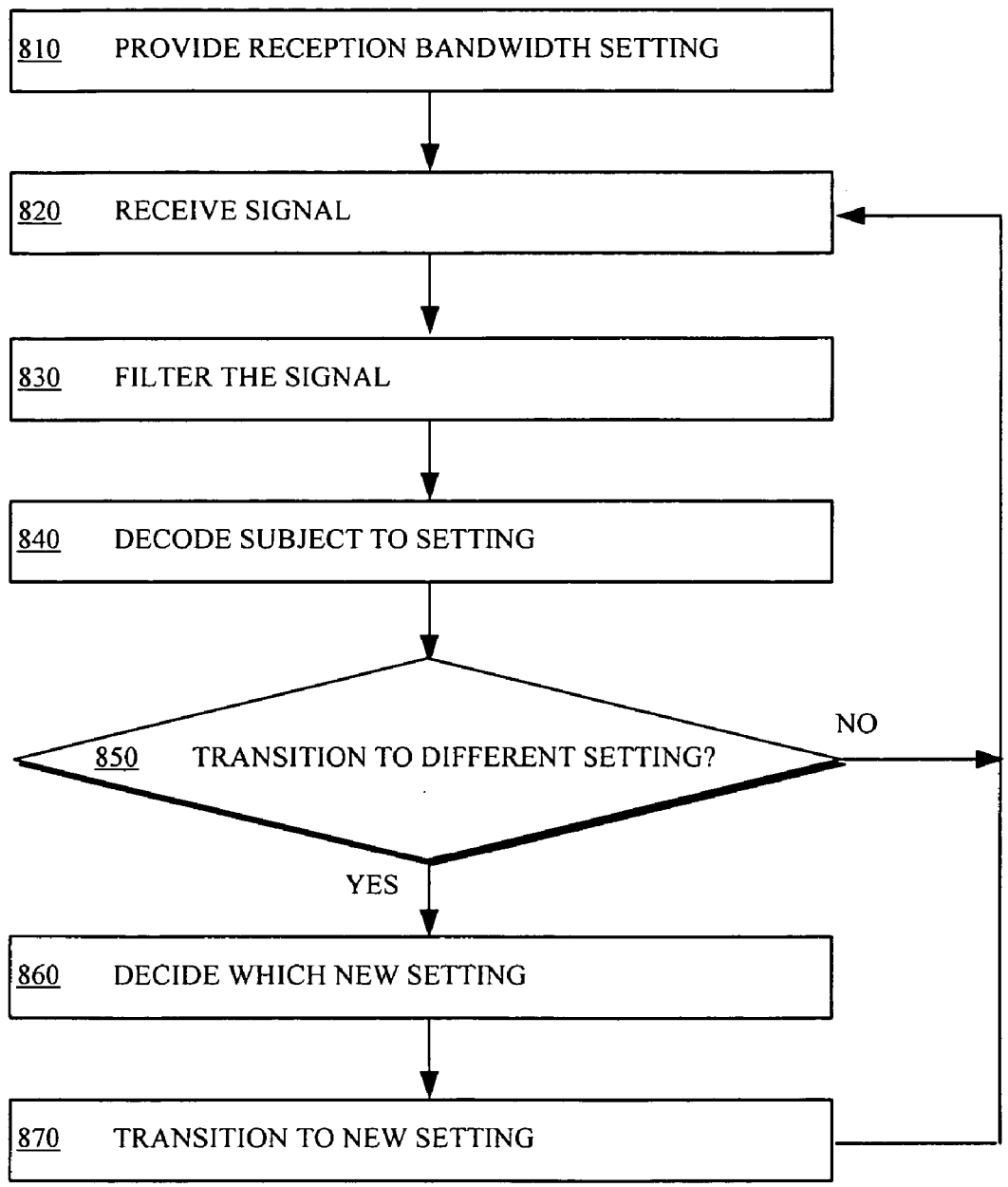
FIG. 8 is a flowchart illustrating a method according to an embodiment of the present invention.

FIG. 8 is flowchart 800 illustrating a method according to an embodiment of the invention. The method of flowchart 800 may be practiced by different embodiments of the invention, including but not limited to RFID tag 120, an RFID tag that includes component groups 320, 520, 620, 720-A, and 720-B.

At block 810, a reception bandwidth setting is provided. This may be implemented as a setting from the factory, or as a setting programmed to take place at power on. The setting provided at this block becomes the current setting, unless and until it is changed. The remainder of the blocks of flowchart 800 may be performed at this or at another setting.

At next block 820, a signal is received. This may be an RF wireless signal, such as from a reader, or a signal generated in response to receiving an RF wireless signal at a different part of a circuit.

At next block 830, the received signal is filtered. This may take place after an envelope signal has been extracted from the received signal. It may take place only once, subject to the current reception bandwidth setting, or a number of times, with one of the signals to be selected later on.

At next block 840, the signal is decoded subject to the current reception bandwidth setting. This may take place after the signal has been filtered. As per the above, decoding may take place only once, from a signal filtered and/or selected according to the current reception bandwidth setting. Alternately, decoding may be performed on a number of filtered signals, and then selecting one of them may be performed according to the current reception bandwidth setting, before or after interpreting.

At next block 850, it is determined whether to transition to a new reception bandwidth setting, such as to one of the settings shown in FIG. 4. In some embodiments, the decision is made according to the signal decoded at the current setting, at block 840 above. In some embodiments, transitioning is performed responsive to the decoded signal.

The decision may be made by comparing the decoded signal with a preset code, such as code 768 in FIGS. 7A and 7B. In some embodiments, code 768 is at least a portion of a preamble. Then, determining whether to transition or not to the second setting depends on the comparison.

If, at block 850, it is determined to not transition, execution returns to block 820. Then another signal or portion of a signal is received, and processed at the same current setting without transitioning, as per the above.

In some embodiments, it is determined to transition if the decoded signal does not match the preset code, at the comparison of block 850. In other words, the RFID tag does not recognize what it receives at the current setting, and will attempt a new bandwidth setting. In some of those embodiments, the tag will listen (or "dwell") at the current setting for some waiting time, before transitioning. That waiting time can be any suitable time, such as two preamble durations.

In other embodiments, it is determined to transition if the decoded signal matches the preset code, at the comparison of block 850. For example, referring to FIGS. 2A, 2B, 2C, at time T1, the preset code that is matched is that of the beginning of a number of preambles. From then on, it may be determined to transition anyway.

If, at block 850, it is determined to transition, at optional next block 860, it is determined what new setting to transition to. In some instances, a plurality of reception bandwidth settings are provided, each of which corresponds to a different reception bandwidth. In some of those instances, the bandwidths are continuous. The choice is made according to the bandwidth.

In some embodiments, the new setting is the one with the largest bandwidth. For example, referring to FIGS. 2A, 2B, 2C, listening until time T1 for the beginning of the preambles could be done at a fixed bandwidth, such as approximately 50 kHz. Then, at detection, the new setting may be by default the one with the highest bandwidth.

In other embodiments, the new setting depends on the current setting. For example, the new setting can be the one that incrementally diminishes the bandwidth. If discrete bandwidth options are provided, then decreasing is to the step with the next smaller option, and so on. In that case, the RFID tag can sequentially diminish the bandwidth, until it reaches the lowest value. In some of those embodiments, the RFID tag can start from the highest value.

In yet other embodiments, an active data rate of the transmission is determined from the decoded signal. Then there need not be a sequential trying, but the new setting can be the one with the bandwidth that best fits the active data rate.

The active data rate of the transmission may be determined in a number of ways. In one embodiment, the active data rate is determined by determining a bit period between successively received symbols of the decoded signal. In another embodiment, the decoded signal is a preamble that has a preassociated data rate, and the active data rate is determined from the preassociated data rate. In yet another embodiment, the decoded first signal is a DATA RATE command, which is followed by an associated data rate instruction. A DATA RATE command may be agreed upon by convention. The active data rate is determined from the instruction.

At optional next block 870, there is transitioning to the next decided setting. Transitioning may be accomplished in a number of ways, such as by adjusting a bandwidth of a filter, or by changing a path of the received signal. The signal path may include a first filter, and switching may route the following signal through a second filter, and so on.

Execution then returns to block 820. Then another signal or portion of a signal is received, and processed at the new setting, as per the above.

The effects and benefit of switching reception bandwidth settings are now described.

Figure 9A:
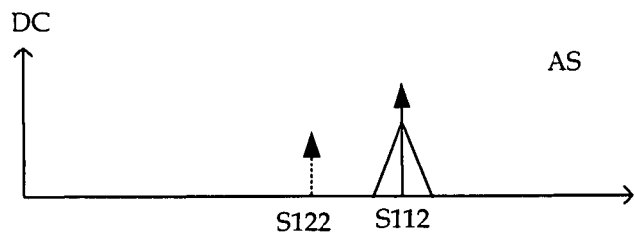
FIG. 9A is an intensity-frequency diagram showing the power spectral densities of two RF signals that reach concurrently an antenna of the RFID tag in FIG. 1.

FIG. 9A is an intensity-frequency diagram showing the power spectral densities of two RF signals that reach concurrently an antenna of the RFID tag in FIG. 1. Signal 112 has a carrier S112, with the remainder of its signal distributed around it, while signal 122 has a carrier S122. It is assumed for simplicity of this description that signal 122 is only the carrier, although that need not be the case. Together, these signals form antenna signal AS.

Figure 9B:
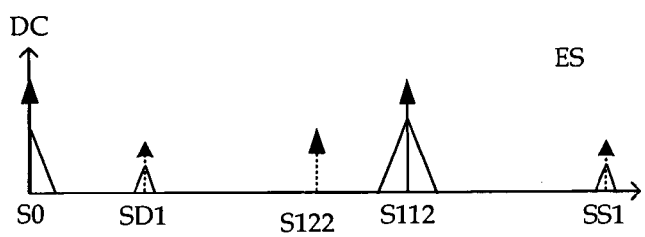
FIG. 9B is an intensity-frequency diagram showing the power spectral densities of the interfering signals of FIG. 9A, as they emerge from an envelope detector of FIG. 3.

FIG. 9B is an intensity-frequency diagram showing the power spectral densities of the interfering signals of FIG. 9A, as they emerge from an envelope detector of FIG. 3. It will be understood that the drawing is not necessarily to scale along the vertical axis, because of attenuation, any amplifying and so on. Signal 122 survives as the carrier S112 and the signal around it, and is also replicated around a DC frequency carrier S0. Carrier S122 emerges, as well. In addition, interference also produces a difference beat frequency SD1 by subtraction, and a sum beat frequency SS1 by addition of carriers S112, S122. Furthermore, each one of difference beat frequency SD1 and sum beat frequency SS1 has signal around it. All these signals form envelope signal ES.

Filtering the signal is advantageously performed around DC frequency carrier S0. This is preferred, because only a low pass filter need be employed, instead of a bandpass filter. Three choices are shown below, corresponding to successive settings of decreasing bandwidths.

Figure 9C:
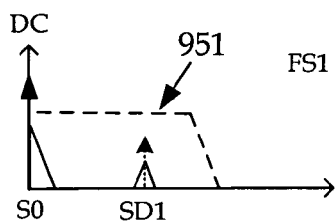
FIG. 9C is an intensity-frequency diagram showing the power spectral densities of signals emerging from a filter(s) block of FIG. 3 in response to the signals of FIG. 9B, in the event that a first filter bandwidth choice is implemented.

FIG. 9C is an intensity-frequency diagram showing the power spectral densities of signals emerging from a filter(s) block of FIG. 3 in response to the signals of FIG. 9B. A first filter bandwidth choice 951 is implemented. It will be noted that filtered signal FS1 includes the desired component FS0, but also difference beat frequency SD1 and the signal around it. It will be further noted that all other signals have been rejected.

Figure 9D:
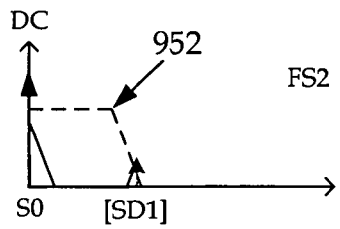
FIG. 9D is an intensity-frequency diagram showing the power spectral densities of signals emerging from a filter(s) block of FIG. 3 in response to the signals of FIG. 9B, in the event that a second filter bandwidth choice is implemented.

FIG. 9D is an intensity-frequency diagram showing the power spectral densities of signals emerging from a filter(s) block of FIG. 3 in response to the signals of FIG. 9B. A second filter bandwidth choice 952 is implemented. It will be noted that filtered signal FS2 is even more successful than filtered signal FS1, in that a portion of the signal around difference beat frequency SD1 is also rejected.

Figure 9E:
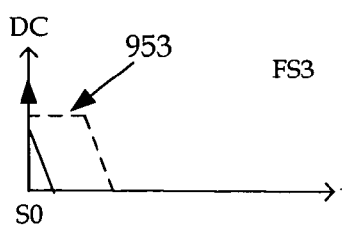
FIG. 9E is an intensity-frequency diagram showing the power spectral densities of signals emerging from a filter(s) block of FIG. 3 in response to the signals of FIG. 9B, in the event that a third filter bandwidth choice is implemented.

FIG. 9E is an intensity-frequency diagram showing the power spectral densities of signals emerging from a filter(s) block of FIG. 3 in response to the signals of FIG. 9B. A third filter bandwidth choice 953 is implemented. It will be noted that filtered signal FS3 is even more successful than filtered signal FS2, all signal around difference beat frequency SD1 is rejected.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An RFID tag comprising:
   a decoder operable to decode a first wireless signal received subject to a first reception bandwidth setting; and
   a selector switch operable to select, responsive to the first decoded signal, one of a second reception bandwidth setting and a third reception bandwidth setting different from the second reception bandwidth setting, such that the decoder is operable to further decode a subsequently received second signal subject to the selected reception setting.

2. The tag of claim 1, in which the first reception bandwidth is the same as one of the second and the third reception bandwidth settings.

3. The tag of claim 1, in which the first reception bandwidth is different from the second and the third reception bandwidth settings.

4. The tag of claim 1, further comprising:
   a filter, and
   in which the selector switch adjusts a bandwidth of the filter.

5. The tag of claim 4, in which the filter is an active filter.

6. The tag of claim 4, in which the filter is a passive filter.

7. The tag of claim 4, in which the bandwidth is adjustable continuously over a range.

8. The tag of claim 4, in which the filter includes a capacitor and a switch configured to be switched at a variable rate.

9. The tag of claim 1, further comprising:
   a plurality of filters in possible paths of the received signal, and
   in which the selector switch is configured to route the received first and second signal through different ones of the paths.

10. The tag of claim 1, in which
    the decoder is further adapted to generate a trigger signal responsive to decoding the first signal, and further comprising:
    a filter bandwidth adjuster adapted to control the selector switch responsive to the trigger signal.

11. The tag of claim 1, in which
    the decoder is further operable to compare the decoded signal to a preset code, and
    the selector switch is operable to select responsive to the comparison.

12. The tag of claim 11, in which the preset code is at least a portion of a preamble.

13. The tag of claim 1, in which
    the decoder is operable to determine an active data rate from the first signal, and
    the selector switch is operable to select responsive to the active data rate.

14. The tag of claim 13, in which the decoded signal is a preamble that has a preassociated active data rate.

15. The tag of claim 13, in which the active data rate is determined by determining a bit period from received symbols of the decoded first signal.

16. The tag of claim 13, in which the decoded signal is a DATA RATE command indicating the active data rate.

17. A method for operating an RFID tag, comprising:
    receiving a first wireless signal;
    decoding the first signal subject to a first reception bandwidth setting;
    selecting, responsive to the first decoded signal, one of a second reception bandwidth setting and a third reception bandwidth setting different from the second reception bandwidth setting;
    receiving a second wireless signal; and
    decoding the second signal subject to the selected setting.

18. The method of claim 17, in which the first reception bandwidth is the same as one of the second and the third reception bandwidth settings.

19. The method of claim 17, in which the first reception bandwidth is different from the second and the third reception bandwidth settings.

20. The method of claim 17, in which selecting is performed by adjusting a bandwidth of a filter.

21. The method of claim 17, in which selecting is performed by changing a path of the second received signal in response to the first received signal.

22. The method of claim 17, in which
    the signal path includes a first filter, and
    selecting routes the signal through a second filter.

23. The method of claim 17, further comprising:
    generating a trigger signal, and
    in which selecting is performed responsive to the trigger signal.

24. The method of claim 17, further comprising:
    selecting a fourth reception bandwidth setting different from the first, second, and third settings;
    receiving a third wireless signal; and
    decoding the third signal subject to the fourth setting.

25. The method of claim 17, further comprising:
    comparing the decoded signal to a preset code, and
    in which selecting is performed responsive to the comparison.

26. The method of claim 25, in which the preset code is at least a portion of a preamble.

27. The method of claim 17, in which
  decoding includes determining an active data rate from the first signal, and
  selecting is performed responsive to the active data rate.

28. The method of claim 27, in which the decoded signal is a preamble that has a preassociated active data rate.

29. The method of claim 27, in which the active data rate is determined by determining a bit period from received symbols of the decoded first signal.

30. The method of claim 27, in which the decoded signal is a DATA RATE command indicating the active data rate.

31. A circuit for an RFID tag, comprising:
  a decoder operable to decode a first wireless signal received subject to a first reception bandwidth setting; and
  a selector switch operable to select, responsive to the first decoded signal, one of a second reception bandwidth setting and a third reception bandwidth setting different from the second, such that the decoder is operable to further decode a subsequently received second signal subject to the selected reception setting.

32. The circuit of claim 31, in which the first reception bandwidth is the same as one of the second and the third reception bandwidth settings.

33. The circuit of claim 31, in which the first reception bandwidth is different from the second and the third reception bandwidth settings.

34. The circuit of claim 31, further comprising:
  a filter, and
  in which the selector switch adjusts a bandwidth of the filter.

35. The circuit of claim 34, in which the filter is an active filter.

36. The circuit of claim 34, in which the filter is a passive filter.

37. The circuit of claim 34, in which the bandwidth is adjustable continuously over a range.

38. The circuit of claim 34, in which the filter includes a capacitor and a switch configured to be switched at a variable rate.

39. The circuit of claim 31, further comprising:
  a plurality of filters in possible paths of the received signal, and
  in which the selector switch routes the received first and second signal through different ones of the paths.

40. The circuit of claim 31,
  in which the decoder is further adapted to generate a trigger signal responsive to decoding the first signal, and
  further comprising: a filter bandwidth adjuster adapted to control the selector switch responsive to the trigger signal.

41. The circuit of claim 31, in which
  the decoder is further operable to compare the decoded signal to a preset code, and
  the selector switch is operable to select responsive to the comparison.

42. The circuit of claim 41, in which the preset code is at least a portion of a preamble.

43. The circuit of claim 31, in which
  the decoder is operable to determine an active data rate from the first signal, and
  the selector switch is operable to select responsive to the active data rate.

44. The circuit of claim 43, in which the decoded signal is a preamble that has a preassociated active data rate.

45. The circuit of claim 43, in which the active data rate is determined by determining a bit period from received symbols of the decoded first signal.

46. The circuit of claim 43, in which the decoded signal is a DATA RATE command indicating the active data rate.

* * * * *